United States Patent
Bertonis et al.

(10) Patent No.: US 7,917,931 B2
(45) Date of Patent: *Mar. 29, 2011

(54) APPARATUS AND METHOD FOR EXTENDING DOCSIS CABLE MODEM SERVICE OVER WIRELESS LINKS

(75) Inventors: James Bertonis, Los Gatos, CA (US); Terrence R. Nash, Richboro, PA (US); Alfred F. Melzig, Los Gatos, CA (US)

(73) Assignee: Arcowv Wireless LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/560,944

(22) Filed: Sep. 16, 2009

(65) Prior Publication Data
US 2010/0011400 A1    Jan. 14, 2010

Related U.S. Application Data

(62) Division of application No. 10/463,483, filed on Jun. 16, 2003, now Pat. No. 7,596,798.

(51) Int. Cl.
*H04N 7/18* (2006.01)

(52) U.S. Cl. .............. 725/81; 725/78; 725/79; 725/80; 725/82; 725/111; 725/123; 725/126; 725/127; 725/128; 725/129; 370/319; 370/334; 370/341; 370/344; 370/349; 370/455; 370/471; 370/474; 370/480

(58) Field of Classification Search .............. 725/78–82, 725/111, 119, 123, 126–129, 149; 370/319, 370/334, 341
See application file for complete search history.

(56) References Cited

U.S. PATENT DOCUMENTS

| | | | |
|---|---|---|---|
| 5,161,021 A | 11/1992 | Tsai | |
| 5,793,413 A | 8/1998 | Hylton et al. | |
| 5,870,134 A | 2/1999 | Laubach et al. | |
| 5,901,340 A | 5/1999 | Flickinger et al. | |
| 5,970,400 A | 10/1999 | Dwyer | |
| 6,032,031 A | 2/2000 | Takaki | |
| 6,486,907 B1 | 11/2002 | Farber et al. | |
| 6,734,804 B1 | 5/2004 | Lee | |
| 7,073,075 B2 | 7/2006 | Freyman et al. | |
| 7,085,530 B2 * | 8/2006 | Weissman | 455/7 |
| 7,505,531 B1 * | 3/2009 | Pasternak et al. | 375/298 |
| 2001/0053180 A1 | 12/2001 | Asia et al. | |
| 2002/0026643 A1 | 2/2002 | Ewen et al. | |
| 2002/0147978 A1 | 10/2002 | Dolgonos et al. | |
| 2003/0066088 A1 | 4/2003 | Jung | |

(Continued)

FOREIGN PATENT DOCUMENTS

EP    0884915 A2    12/1998
(Continued)

*Primary Examiner* — Brian T Pendleton
*Assistant Examiner* — Nnenna Ekpo
(74) *Attorney, Agent, or Firm* — Connolly Bove Lodge & Hutz LLP (57) ABSTRACT

An apparatus and method are presented to allow the extension of a DOCSIS cable modem service over a wireless link. According to the invention a wireless hub transceiver is connected to a distribution coax cable of a DOCSIS based system. The downstream data are transferred over a wireless link to a remote subscriber radio frequency (RF) unit connected to a cable modem that provides the downstream data to the subscriber. Similarly, upstream data are sent from the subscriber cable modem over the wireless link to the wireless hub transceiver where such data are inserted back to the distribution coax cable.

25 Claims, 6 Drawing Sheets

U.S. PATENT DOCUMENTS

| | | |
|---|---|---|
| 2004/0158167 A1 * | 8/2004 | Smith et al. .................. 600/547 |
| 2005/0010958 A1 | 1/2005 | Rakib et al. |
| 2005/0251846 A1 | 11/2005 | Dravida et al. |
| 2007/0042787 A1 | 2/2007 | Hsu et al. |

FOREIGN PATENT DOCUMENTS

| | | |
|---|---|---|
| GB | 2253770 A | 9/1992 |
| GB | 2361145 A | 10/2001 |

* cited by examiner

APPARATUS AND METHOD FOR EXTENDING DOCSIS CABLE MODEM SERVICE OVER WIRELESS LINKS

CROSS REFERENCE TO RELATED APPLICATION

The present application is a divisional of co-pending Application Ser. No. 10/463,483, filed Jun. 16, 2003, the entire contents of which are incorporated herein by reference.

FIELD OF THE INVENTION

The invention relates generally to providing of downstream and upstream data connectivity, and more specifically to an interface that allows the extension of a DOCSIS cable modem service over wireless links.

BACKGROUND OF THE INVENTION

The delivery of data using the cable television (CATV) system has become common in residential areas where CATV is commonly available. The data are delivered both downstream and upstream using available channels and/or frequencies. The end user can connect to the data systems through a cable modem that is capable of delivering the downstream data respective of the specific user to that user, as well as sending upstream data sent by the user which is intended to reach another node of the data network.

Figure 1:
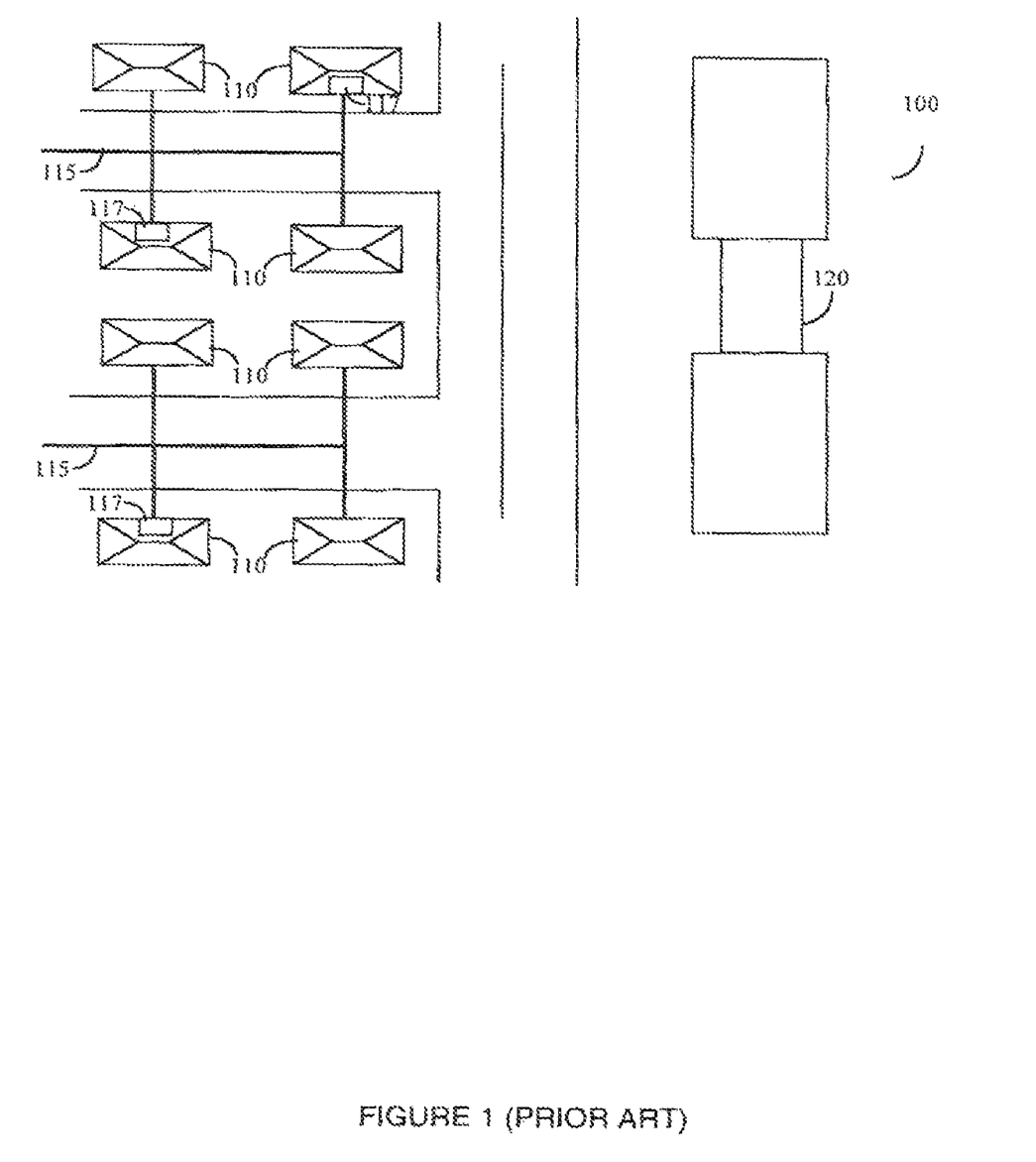
FIG. 1 is a schematic diagram of distribution of CATV coax cables in a residential area.

Because providers of CATV expect to deliver additional services, such as data for Internet connectivity, there is an interest to serve as large as possible number of clients. However, it is not always possible to provide a direct connection to each location. For example, a shopping mall near a residential area is not commonly wired for the use of CATV as the necessity of such is quite low. FIG. 1 is a diagram which shows the distribution of CATV to a residential area. Clients use a cable modem to have access to downstream data and to transfer data upstream. If the CATV operator would like to provide a service to clients in the shopping mall a distribution coax cable would have to be laid at a significant cost.

Some cable modems are compliant with Data Over Cable Service Interface Specifications (DOCSIS), which are interface specifications for standard, interoperable, data-over-cable network products. Internet Service Providers (ISPs) using the Multichannel Multipoint Distribution Service (MMDS) may also be compatible with DOCSIS. However, current MMDS networks are not entirely satisfactory. MMDS networks are characterized by the limited number of channels available in the low radio frequency (RF) bands. Only 200 MHz of spectrum (between 2.5 GHz and 2.7 GHz) is allocated for MMDS use. This constraint reduces the effective number of channels in a single MMDS system.

Moreover, the MMDS wireless cable uses 6 MHZ television channels for upstream and downstream transmission. These channels are relatively closely spaced in frequency. Because the channels are so closely spaced in frequency, a diplexer is required at each subscriber location to separate the upstream transmission path and the downstream receive path. Thus, the processing equipment required, including the diplexer, is relatively expensive and cumbersome. And, the up to two 6 MHZ channels which may be allocated to the reverse direction are the maximum frequency spectrum, which is a significant limitation. In addition, because the MMDS channels are licensed, the ISP must go to the expense of purchasing or leasing a license that could cost in the millions of dollars.

Fortunately, in 1997 the Federal Communication Commission (FCC) set aside 300 MHz of spectrum in the 5 GHz band for the Unlicensed National Information Infrastructure (U-NII) service. Three bands are defined in this spectrum: 5.15 to 5.25 GHz (U-NII band 1) and 5.25 to 5.35 GHz (U-NII band 2), which are designated for wireless LAN and other short-range use; and 5.725 to 5.825 GHz (U-NII band 3) for wide-area networking that reaches a greater distance with higher power. From time-to-time the FCC or another regulator may add a U-NII band, e.g. the proposal for a frequency range of 5.470 to 5.725 GHz. The U-NII bands are designated for wideband, high-data-rate digital communications. They are also license-free; no license is required to operate on the U-NII bands. A detailed description of a system allowing to overcome some of these limitations and exploiting the non-license bearing air bands is provided in U.S. patent application Ser. No. 10/282,533, titled System And Method For Wireless Cable Data Transmission.

It would be therefore advantageous to provide a apparatus and a method that would allow such a CATV operator to deliver a data service to areas which are in the proximity of the service area but are not currently reached by a distribution coax cable. It would be further advantageous if such a system would not require additional transmission licenses.

SUMMARY OF THE INVENTION

An apparatus and method are presented to allow the extension of a DOCSIS cable modem service over a wireless link. According to the invention a wireless hub transceiver is connected to a distribution coax cable of a DOCSIS based system. The downstream data are transferred over a wireless link to a remote subscriber radio frequency (RF) unit connected to a cable modem that provides the downstream data to the subscriber. Similarly, upstream data are sent from the subscriber cable modem over the wireless link to the wireless hub transceiver where such data are inserted back to the distribution coax cable.

DETAILED DESCRIPTION OF THE INVENTION

Reference is now made to FIG. 1 where an architecture 100 for the distribution of CATV over coax cable 115 to residences 110 is shown. Some of the residences 110 may be able to communicate data over the cable system 115 by connecting to a cable modem 117. Commonly, cable distribution is limited to the residential area itself and commercial areas, such as a shopping mall 120 that may be located several hundred or thousands of feet away from the end of the distribution area. With the advance of the delivery of data using cable modems it may be desirable for the cable provider to provide such data delivery to the mall 120. However, the investment in laying physical coax cable for distribution purposes may be quite prohibitive.

Figure 2:
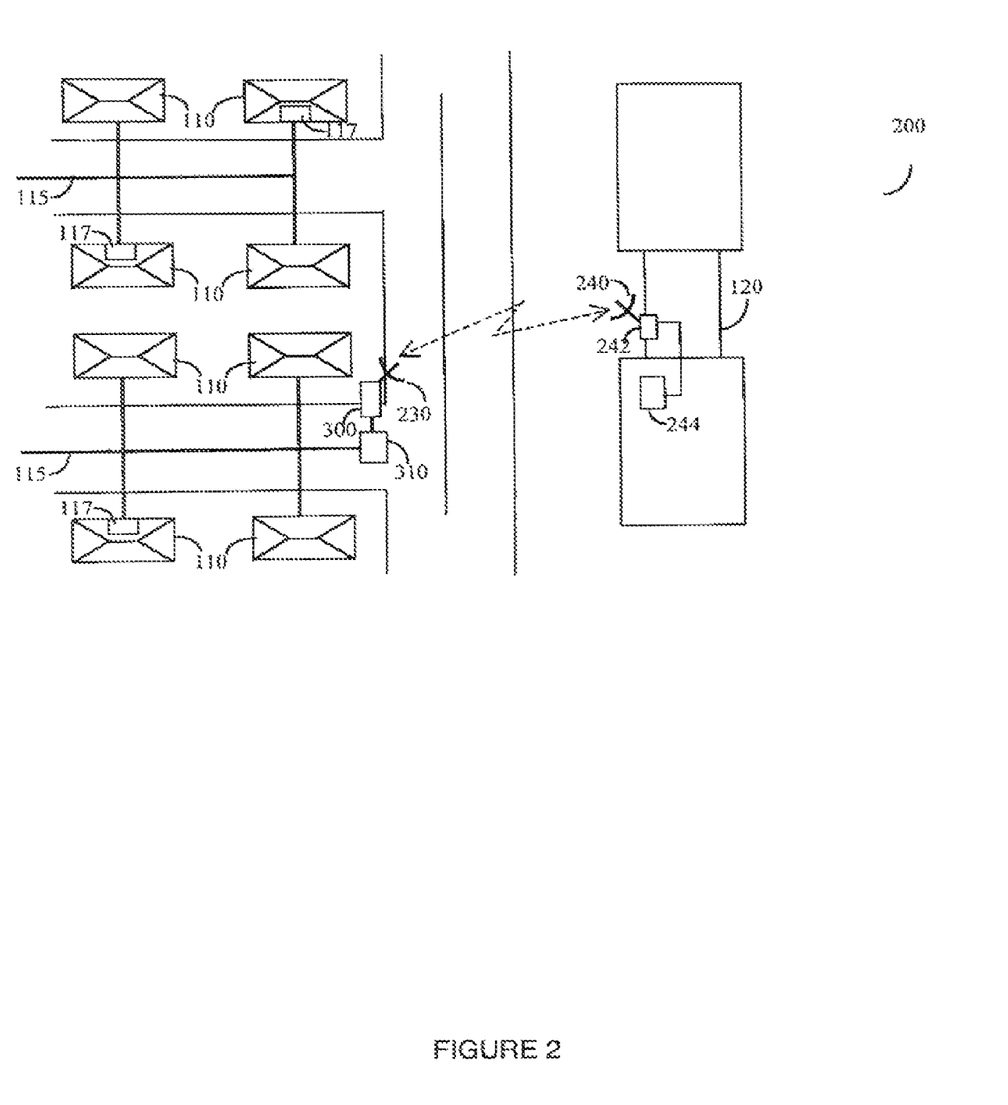
FIG. 2 is a schematic diagram of distribution of CATV coax cables in a residential area with a wireless extension in accordance with the disclosed invention.

Referring to FIG. 2 a modified CATV distribution scheme using wireless communication to deliver data to the shopping mall 120 is shown. The splitter unit (SU) 310 is connected to the distribution coax cable 115. The SU 310 delivers downstream data to a wireless hub transceiver (WHT) 300 and the WHT 300 provides the SU 310 upstream data. The WHT 300 uses an antenna 230 to communicate with an antenna 240, as explained in more detail below. A receiving unit comprised of an antenna 240 and a subscriber radio frequency unit (SRFU) 242, is described in detail in U.S. patent application Ser. No. 10/282,533, titled System And Method For Wireless Cable Data Transmission. The SRFU 242 is further connected to a cable modem, therefore enabling a subscriber in the mall 120 to receive data communication through the extension of the Data Over Cable Service Interface Specifications (DOCSIS) cable modem service over a wireless link. A more detailed description of an exemplary SRFU 242 is provided below. A person skilled in the art may easily modify such a receiving unit to further support a 64 quadrature amplitude modulation (QAM). The SU 310 provides upstream and downstream connectivity to the WHT 300. In one embodiment, the SU 310 further provides the AC power required for the operation of the WHT 300. A more detailed description of the WHT 300 is provided below.

Figure 3:
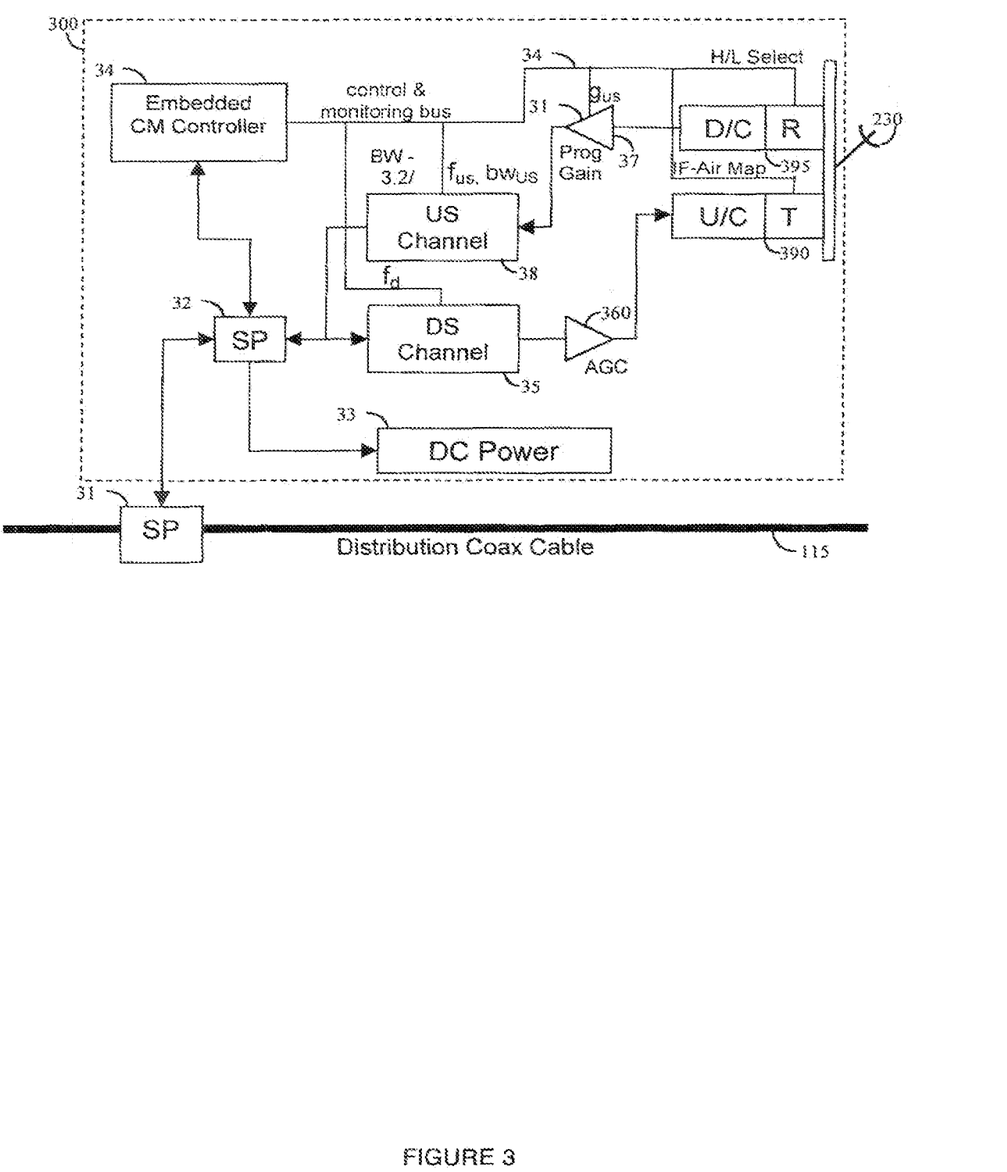
FIG. 3 is a schematic block diagram of a wireless hub transceiver connected to a distribution coax cable of a CATV.

Reference is now made to FIG. 3 where a detailed block diagram of a WHT 300 connected through a SU 310 to a distribution coax cable 115 is shown. The WHT 300 comprises a splitter 320, an embedded cable modem controller 340, a downstream channel unit 350, an automatic gain control 360, a programmable gain 310, an upstream channel unit 380, an up converter transmitter unit 390, and a down converter receiver unit 395, both of converters being connected to an antenna 230. A DC power unit 330 is optionally connected to a splitter 320 if it is possible to provide AC power off the distribution coax cable 115.

The splitter 320 is responsible of handling the signal communication with the SU 310, operating in conjunction with the embedded cable modem controller 340, as well as delivering and receiving downstream and upstream signals to the downstream channel unit 350 and the upstream channel unit 380, respectively. Optionally, if the distribution coax cable 115 is capable of delivering AC power to the WHT 300, then the splitter 320 is further responsible for delivering this AC power to the DC power unit 330 that provides the DC power required by the WHT 300 for its operation.

The operation of the WHT 300 is performed under the control of the embedded cable modem controller 340. Various control signals are delivered to components of the WHT 300. The downstream channel unit 350 is controlled as to the center DOCSIS downstream frequency ($f_{ds}$) for wireless operation. The bandwidth used is 6 MHz, which is the standard bandwidth used in CATV systems. The upstream channel unit is controlled for both the center DOCSIS upstream frequency ($f_{us}$) for wireless operation as well as for the upstream DOCSIS bandwidth ($bw_{us}$) which is selective at doubling steps starting from 200 KHz up to 3.2 MHZ, or 6.4 MHz in the case of DOCSIS 2.0. DOCSIS carriers support frequencies of 50-860 MHz for downstream communication and 5-48 MHz for upstream communication. The embedded cable modem controller 340 further controls the down converter 395 as to the selection of the upstream carrier frequencies in the range of 5.252 to 5.348 GHz, or alternatively 5.472 to 5.568 GHz. These frequencies are selected such that they are in the non-license bearing frequency spectrum. It further controls the up converter 390 as for the operation of the cable frequency air map, i.e. the conversion necessary from the cable frequency to the air frequency for the wireless downstream transmission. This is performed by adding the cable frequency to the downstream base frequency. For example, if the cable downstream frequency is 459 MHz and the wireless frequency is 5.284 GHz then the resultant air frequency is 5.743 GHz. These frequencies are selected such that they are in the non-license bearing frequency spectrum. Hence, the embedded cable modem controller 340 determines the DOCSIS carrier frequency mapping from cable to air.

An automatic gain control (AGC) 360 connected between, the downstream channel unit 350 and the up converter transmitter unit 390 ensures that the correct level of gain is used. This is particularly important because the CATV signal received through distribution coax cable 115 may vary considerably throughout its distribution area. However, for the purposes of quality transmission it is essential to maintain required levels of signal. Similarly, a programmable gain unit 370 is connected between the down converter receiver unit 395 and the upstream channel unit 380. The gain is controlled by means of an embedded cable modem controller 395 by providing the upstream gain ($g_{us}$) parameter. The value for g can be determined at installation, or, in another embodiment, it can be adjusted from time-to-time automatically through test sequences initiated by the embedded cable modem controller 395. The DOCSIS standard requires that all cable modems adjust their upstream power level in a long AGC loop commanded from the cable modem termination system (CMTS) equipment. The range of adjustment is approximately 50 dB to account for large variations in the cable plant gain. The invention uses the setting of the embedded CM controller upstream level to adjust the gain of the path $g_{us}$ for the wireless subscriber unit. By removing the cable plant level variation in the wireless return path, the subscriber cable modem gain variation is available to compensate for air link radio frequency (RF) level variations. The CMTS in the headend commands the subscriber modem level in the same manner as wired modems, but the actual gain compensation is for the wireless link plus any remaining gain error through the WH300 signal path not fully corrected by the setting of $g_{us}$.

The embedded CM controller 340 periodically computes the correct setting of $g_{us}$ such that the upstream signal level from each of the subscriber modems 244, as commanded by the CMTS during its normal long AGC loop operation, remains within the optimum operating range of the subscriber modem and is presented at the nominal level for entry into the cable system upstream path at the WHT 300 splitter 320. This computation and correction to $g_{us}$ would normally take place less frequently than the normal CMTS/subscriber modem long AGC loop correction. In yet another embodiment, the CM controller 340 monitors as described above, and then adjusts $g_{us}$ for each transmission for each subscriber modem 244 in very small steps so the CMTS can command the subscriber modem 244 to make normal gain changes without being aware that $g_{us}$ is also being adjusted.

Figure 4:
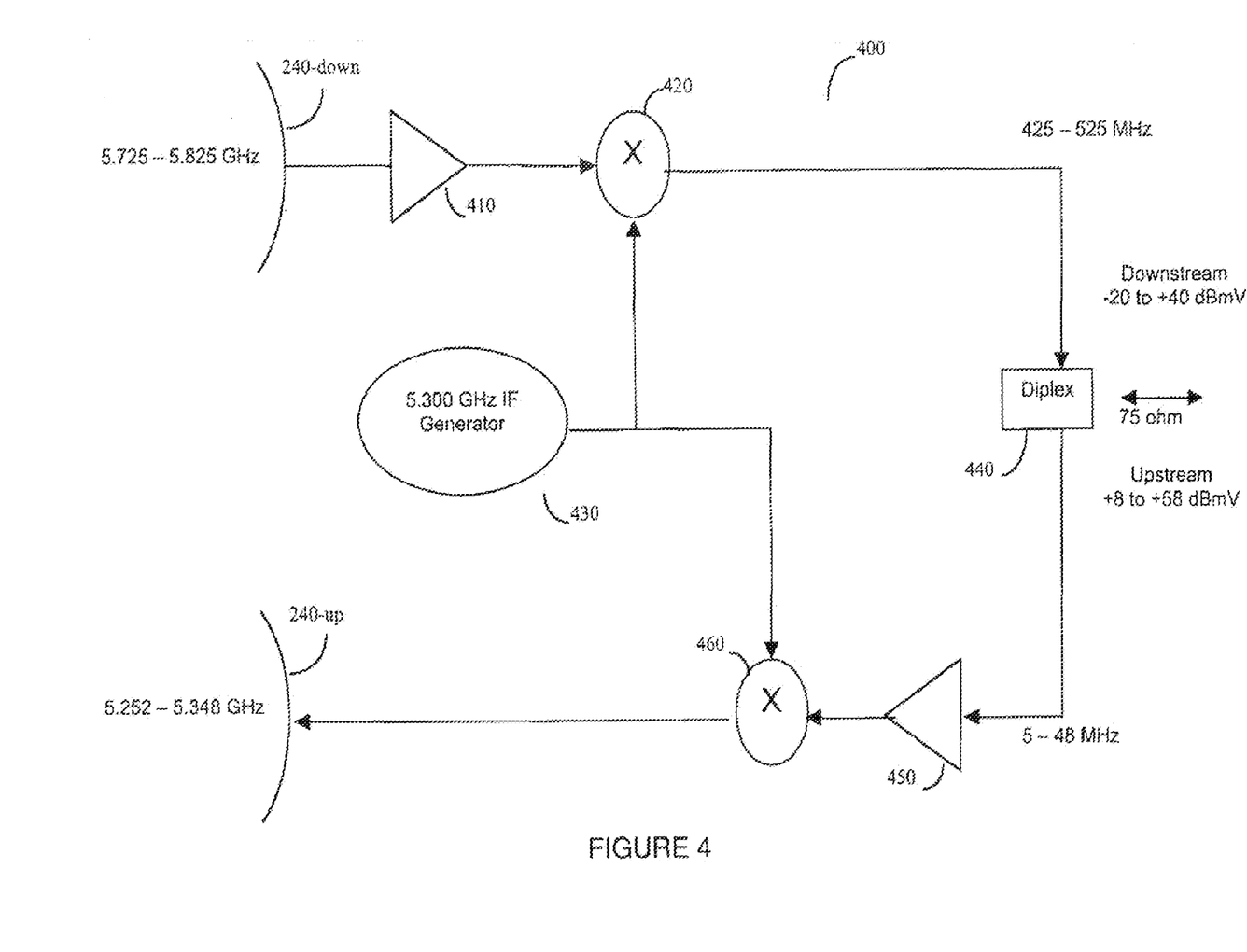
FIG. 4 is a schematic block diagram of a wireless subscriber transceiver connected to a standard DOCSIS cable mode.

Referring to FIG. 4, a non-limiting and exemplary block diagram implementation of a SRFU 242 is shown. The SRFU 242 is connected to the upstream and downstream portions of an antenna 240 that is capable of receiving wireless signals at a frequency range of 5.725 to 5.825 GHz, and that is further capable of transmitting wireless signals at a frequency range of 5.252 to 5.348 GHz. The downstream data is received through a buffer 410 and mixed by means of a mixer 420 with a 5.300 GHz frequency generated by a 5.300 GHz intermediate frequency generator 430. As a result, the original DOCSIS range frequencies are output in the range of 425-525 MHz. The frequency is fed to a diplexer 440 that is capable of connecting to the cable modem 244. The upstream data provided from the cable modem 244 through the diplexer 440 are in the DOCSIS range of 5 to 48 MHz. After buffering using the buffer 450, the signal is mixed by means of a mixer 460 with an intermediate frequency generated by the 5.300 GHz intermediate frequency generator 430. As a result, a wireless frequency in the range of 5.252 to 5.348 is passed to the transmitting portion of the antenna 240-up.

Figures 5, 6:
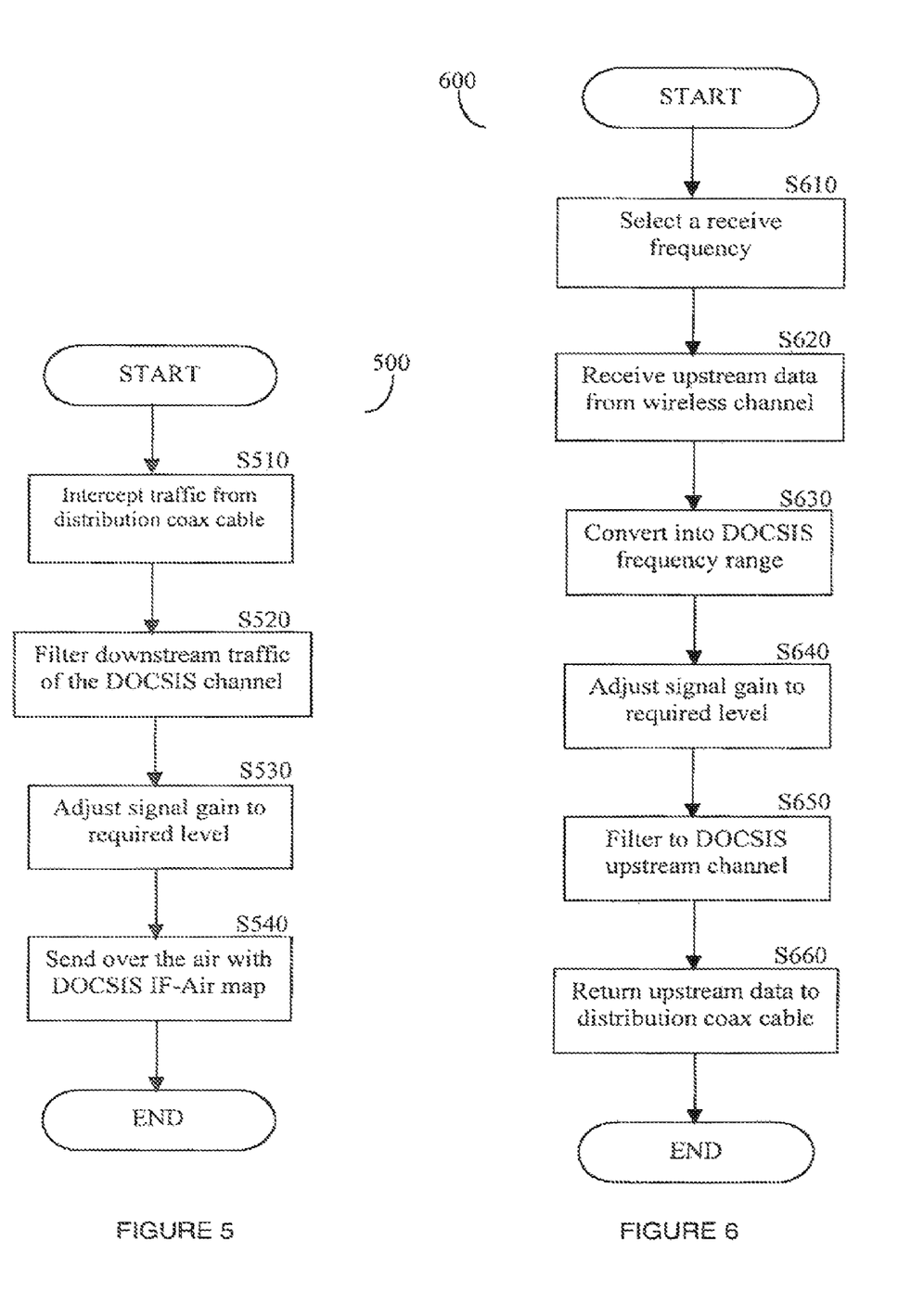
FIG. 5 is an exemplary flowchart describing the downstream flow of data in accordance with the disclosed invention.
FIG. 6 is an exemplary flowchart describing the upstream flow of data in accordance with the disclosed invention.

Reference is now made to FIG. 5, where an exemplary flowchart 500 for sending data for downstream transmission in a CATV data distribution system having a wireless point of termination is shown. In step S510, traffic is intercepted from a CATV distribution coax cable. In step S520, the downstream flow is filtered to the respective DOCSIS channel employed by the specific CATV provider. In step S530, the signal received in step S520 is amplified as may be required, preferably by using an AGC arrangement. In step S540, the DOCSIS cable frequency is sent over the air using a cable frequency to air frequency mapping. For example, if the cable downstream frequency is 459 MHz the wireless frequency could be selected to be 5.743 GHz. These frequencies are selected such that they are in the non-license bearing frequency spectrum in the range of 5.725 to 5.825 GHz. Hence, the embedded cable modem controller 340 determines the DOCSIS carrier frequency mapping from cable to air. The disclosed sequence of steps is repeated every time data need to be transferred upstream from a CATV distribution coax cable 115 using the WHT 300 in accordance with the disclosed invention. It should be noted that in one embodiment the air map ensures that the CM receives its downstream signal aligned with a standard CATV channel plan, e.g. the North American CATV plan. In such an embodiment it is required to maintain the air map at integer intervals of 6 MHz to adhere with the standard channel spacing.

Referring to FIG. 6, an exemplary flowchart 600 for receiving data for upstream transmission in a CATV data distribution system having a wireless point of termination is shown. Initially, in step S610 a return frequency is selected in the range of 5.250 GHz to 5.350 GHz. In step S620, upstream data is received from the wireless channel. The signal is down converted to the DOSIS cable frequency in step S630, specifically in the DOCSIS range of 5 to 48 MHz. The gain of the received signal is then adjusted in step S640. The specific gain $g_{us}$ can be programmed when the system is put in place in accordance with the specific transmit level characteristics of the embedded CM controller. The DOCSIS standard requires that all cable modems adjust their upstream power level in a long AGC loop commanded from the cable modem termination system (CMTS) equipment. The range of adjustment is approximately 50 dB to account for large variations in the cable plant gain. One embodiment of the invention uses the setting of the embedded CM controller upstream level to adjust the gain of the path $g_{us}$ for the wireless subscriber unit. By removing the cable plant level variation in the wireless return path, the subscriber cable modem gain variation is available to compensate for air link RF level variations. The CMTS in the headend commands the subscriber modem level in the same manner as wired modems, but the actual gain compensation is for the wireless link. In step S650, the received signal is filtered for the specific DOCSIS channel used for upstream data delivery. In step S660, the upstream data are injected back to the CATV distribution cable. The disclosed sequence of steps is repeated every time data need to be transferred downstream to CATV distribution coax cable 115 using the WHT 300 in accordance with the disclosed invention. A person skilled in the art would note that step S630 and step S640 could alternately be performed in reverse order, as long as both steps are performed.

Figure 7:
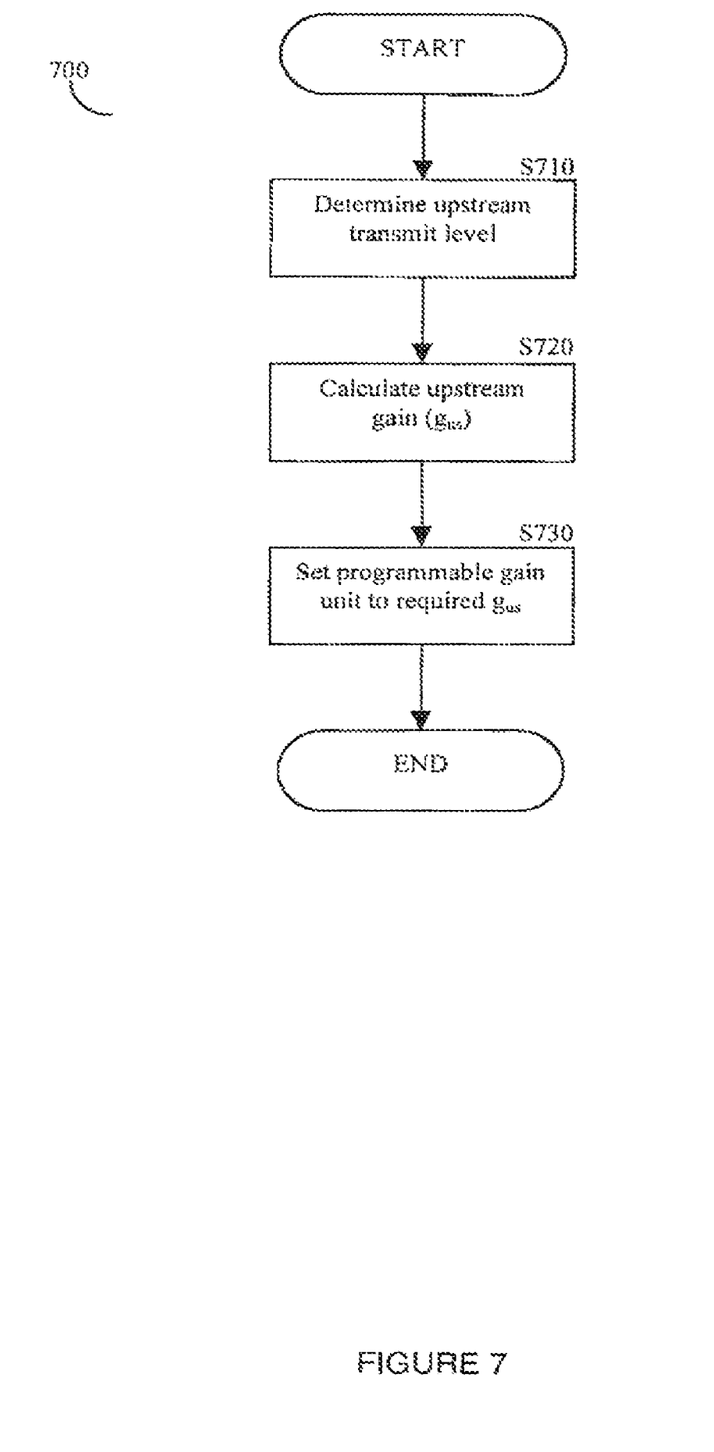
FIG. 7 is a non-limiting exemplary flowchart for the determination of the upstream gain ($g_{us}$).

Referring to FIG. 7, a non-limiting exemplary flowchart 700 for the determination of the upstream gain ($g_{us}$) is shown. At step S710, a normal DOCSIS cable modem signal acquisition for communications between it and the cable headend CMTS equipment is performed. This procedure is part of the normal process whereby the upstream transmit gain is adjusted over a range of approximately 50 dB to deliver the headend CMTS a fixed level of signal. It compensates for cable plant gain variations. In the step S720, the setting for the required upstream gain ($g_{us}$) is determined as a linear relationship to the embedded CM controller's 340 transmit level. In step S730, the $g_{us}$ determined in step S720 is applied to PGU 370. Performing this sequence of steps allows for the removal of gain variability of the upstream cable plant for signals received from the WHT 300. With the cable plant level variation removed, the subscriber cable modem 244 level adjustment range automatically compensates for the air RF link level variations using the normal DOCSIS method.

Although the invention is described herein with reference to the preferred embodiment, one skilled in the art will readily appreciate that other applications may be substituted for those set forth herein without departing from the spirit and scope of the present invention, including, but not limited to, different upstream and downstream frequency ranges which would be mapped accordingly to and from the cable modem. Accordingly, the invention should only be limited by the Claims included below.

The invention claimed is:

1. An apparatus for wireless upstream and downstream access to a cable television service, comprising:
   an embedded cable modem controller to control at least one of an up converter transmitting unit and a down converter receiving unit,
   wherein control of the up converter transmitting unit by the embedded cable modem controller is of at least mapping a frequency of a DOCSIS transmission into a wireless air frequency, and
   wherein the wireless air frequency is frequency mapped based on the sum of the DOCSIS transmission frequency and the wireless air frequency.

2. The apparatus of claim 1, further comprising:
   a splitter to handle signal communication with a splitter unit connected to a distributed coax cable, and
   wherein the splitter is to operate in conjunction with the embedded cable modem controller to deliver and receive downstream signals to and from a downstream channel unit and to deliver and receive upstream signals to and from an upstream channel unit.

3. The apparatus of claim 2, wherein the splitter is to pass through power to operate the apparatus from the distribution coax cable.

4. The apparatus of claim 1, wherein the embedded cable modem controller is configured to control a center downstream frequency of a downstream channel unit for wireless operation.

5. The apparatus of claim 1, wherein the embedded cable modem controller is configured to control an upstream channel unit for at least one of a center upstream frequency for wireless operation and an upstream bandwidth.

6. The apparatus of claim 1, wherein the embedded cable modem controller is further configured to control a down converter as to selection of upstream carrier frequencies.

7. The apparatus of claim 1, wherein the air frequency is selected from a set of air frequencies that are at integer intervals of 6 MHz.

8. The apparatus of claim 1, wherein a DOCSIS intermediate frequency of downstream data is between 50 and 870 MHz.

9. The apparatus of claim 1, wherein a wireless air frequency for a downstream transmission is between 5.725 and 5.825 GHz.

10. The apparatus of claim 1, further comprising an automatic gain control (AGC) connected between a downstream channel unit and the up converter transmitter unit.

11. The apparatus of claim 1, further comprising a programmable gain unit (PGU) connected between an upstream channel unit and the down converter receiving unit,
wherein the embedded cable modem controller is further configured to control the gain of the PGU by providing an upstream gain parameter.

12. The apparatus of claim 11, wherein the embedded cable modem controller is further configured to control the PGU to adjust an upstream power level in a long loop.

13. The apparatus of claim 12, wherein the long loop is a loop that begins at headend of a CATV system.

14. The apparatus of claim 11, further comprising an antenna connected to the up converter transmitting unit and further connected to the down converter receiving unit, the up converter transmitting unit further connected to an automatic gain control and the down converter receiving unit further connected to the PGU.

15. The apparatus of claim 14, wherein the antenna is capable of transmitting downstream to a plurality of wireless subscribers.

16. The apparatus of claim 14, wherein the antenna is capable of receiving upstream from a plurality of wireless subscribers.

17. The apparatus of claim 11, wherein the embedded cable modem controller is further to control the PGU to adjust an upstream power level in a long loop that begins at headend of a CATV system; and
wherein gain control of the PGU is to be performed under control of a cable modem termination system (CMTS) equipment located at the headend.

18. The apparatus of claim 17, wherein a gain control span of the PGU is approximately 50 dB.

19. The apparatus of claim 17, further comprising:
means for determining an upstream transmit level;
means for calculating a desired upstream gain; and
means for setting the PGU to the desired upstream gain.

20. The apparatus of claim 1, wherein the embedded cable modem controller is further configured to control the down converter receiving unit in selecting one of at least two non-license bearing wireless channels.

21. The apparatus of claim 20, wherein the one of at least two non-license bearing channels is one of 5.252 GHz or 5.348 GHz.

22. The apparatus of claim 20, wherein the one of at least two non-license bearing channels is one of 5.472 GHz or 5.568 GHz.

23. A method, comprising:
delivering, by a wireless hub transceiver, upstream data to a distributed coax cable;
mapping, by the wireless hub transceiver, a frequency of a DOCSIS transmission into a wireless air frequency;
delivering, by the wireless hub transceiver, downstream data to a remote receiving unit connected to a cable modem over an antenna, the downstream data to enable a subscriber of the receiving unit to receive data communication through extension of DOCSIS cable modem service over a wireless link, wherein the wireless air frequency is a frequency mapped based on a sum of the DOCSIS transmission frequency and the wireless air frequency; and
receiving, by the wireless hub transceiver, upstream data from the receiving unit over the wireless link and inserting the upstream data back into the distributed coax cable.

24. An apparatus, comprising:
means for delivering upstream data to a distributed coax cable;
means for mapping a frequency of a DOCSIS transmission into a wireless air frequency;
means for delivering downstream data to a remote receiving unit connected to a cable modem over an antenna, the downstream data to enable a subscriber of the receiving unit to receive data communication through extension of DOCSIS cable modem service over a wireless link, wherein the wireless air frequency is a frequency mapped based on a sum of the DOCSIS transmission frequency and the wireless air frequency; and
means for receiving upstream data from the receiving unit over the wireless link and inserting the upstream data back into the distributed coax cable.

25. A system for wireless upstream and downstream access to a cable television service, comprising:
a splitter unit connectable to a distributed coax cable, the splitter unit to deliver downstream data to a wireless hub transceiver; and
the wireless hub transceiver to deliver upstream data to the splitter unit, the wireless hub transceiver to communicate with a remote receiving unit connected to a cable modem over an antenna to enable a subscriber of the receiving unit to receive data communication through extension of DOCSIS cable modem service over a wireless link, wherein
the wireless hub transceiver is to map a frequency of a DOCSIS transmission into a wireless air frequency, and
wherein the wireless air frequency is frequency mapped based on the sum of the DOCSIS transmission frequency and the wireless air frequency.

* * * * *